United States Patent [19]

Eberle et al.

[11] 4,285,257
[45] Aug. 25, 1981

[54] APPARATUS FOR SEPARATING BATTERY PLATES

[75] Inventors: William J. Eberle; Timothy M. Reber, both of Reading, Pa.

[73] Assignee: General Battery Corporation, Reading, Pa.

[21] Appl. No.: 119,508

[22] Filed: Feb. 7, 1980

[51] Int. Cl.³ ............................................. B23D 45/00
[52] U.S. Cl. ........................................ 83/167; 83/29;
83/33; 83/100; 83/422; 83/435; 83/903
[58] Field of Search ................ 83/100, 903, 435, 391, 83/29, 422, 425, 374, 451, 167, 33

[56] References Cited
U.S. PATENT DOCUMENTS

| | | | |
|---|---|---|---|
| 2,207,650 | 7/1940 | Winkel | 83/903 X |
| 2,381,153 | 8/1945 | Feldtkeller | 83/903 X |
| 2,613,699 | 10/1952 | Dudek | 83/435 |

Primary Examiner—J. M. Meister
Attorney, Agent, or Firm—Benasutti Associates, Ltd.

[57] ABSTRACT

An apparatus for separating paired battery plates into individual plates is disclosed. The disclosed apparatus has an improved alignment means which assures that the plates are separated about a fixed centerline. The apparatus is also suited for separating a plurality of stacked plates in a single cycle.

17 Claims, 6 Drawing Figures

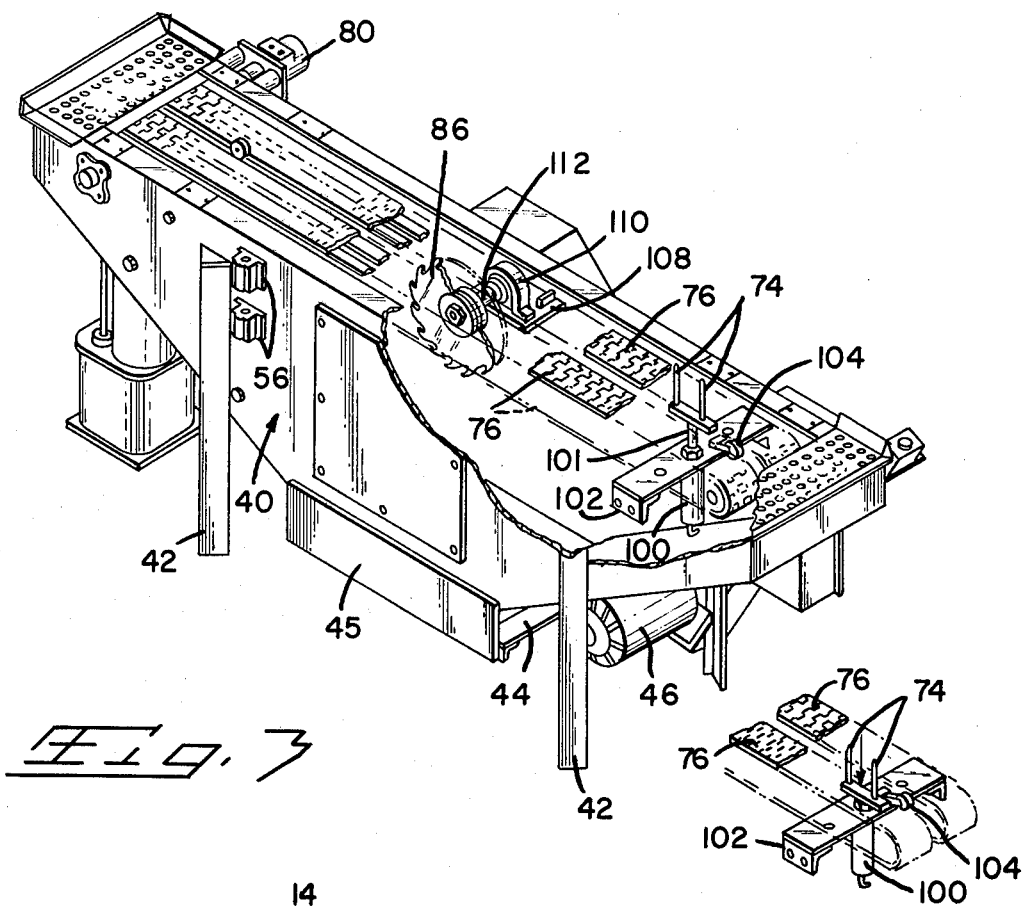
Fig. 3
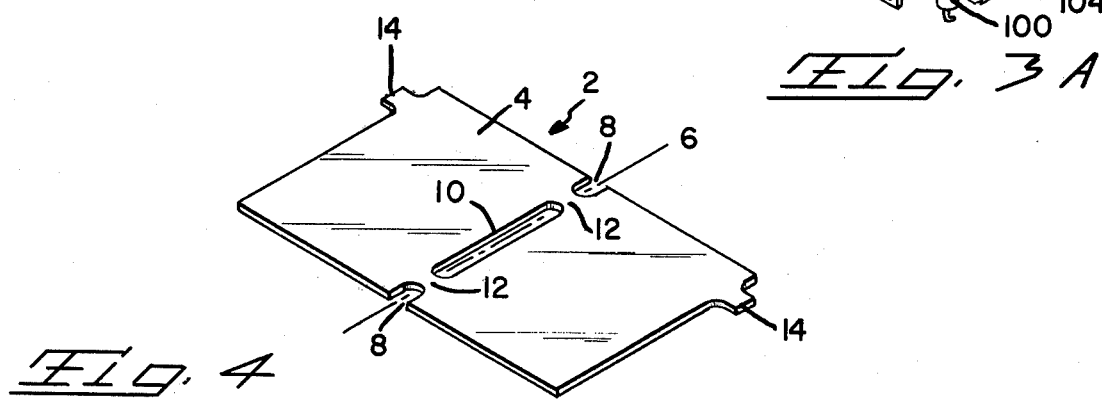
Fig. 3A
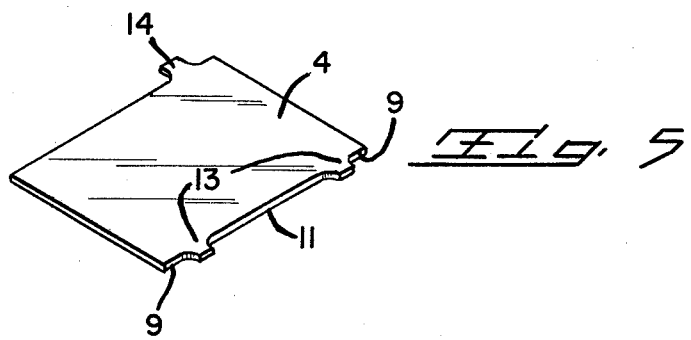
Fig. 4
Fig. 5

APPARATUS FOR SEPARATING BATTERY PLATES

BACKGROUND OF THE INVENTION

1. Field of the Invention

The instant application is directed to a battery plate separating apparatus which is primarily intended for use in the storage battery industry. The battery plate separating device is used in the industry to separate the paired battery plates of a lead casting. The plates which form a storage battery are generally cast of a lead alloy in pairs and are then plated with a lead paste to produce a paired set of battery plates. These paired plates are usually joined in two positions about a centerline through the casting. In order to use the plates in a battery it is required that the paired battery plates be separated.

2. Description of the Prior Art

The prior art technique for separating the battery plates generally consisted of a cutting means disposed so as to contact the center of a workpiece and separate it into two plates. The alignment of the casting was achieved through external alignment gates which located on the outer edge of the casting.

The problem encountered with the prior art devices were two fold. First a casting which was out of square would result in a cut which did not extend along the centerline between the two plates and, therefore, would produce battery plates of less than acceptable quality. Secondly, the means for locating generally required single plates to be located on the conveying means so that plates which were not identical would not have conflicting location points. Attempts to use multiple plates resulted in plates being misaligned and separated in a less than satisfactory manner. The instant invention uses a center location means which assures that the plates will be presented to the separating means along a common center line. This provides an accurate separation, regardless of casting geometry, the exterior portions thereof and conflicting geometry of the individual plates which are stacked.

SUMMARY OF THE INVENTION

The instant invention comprises a frame having a conveying means positioned thereon. The conveying means is separated into two portions disposed on either side of a center line. Along the center line of the conveying means there is disposed, approximately at the longitudinal midsection of the frame, a cutting means such as a rotary blade, reciprocal blade, or a band saw. At one end, which will be called the "load end" of the frame, there is disposed a set of guide pins which are located between the portions of the conveying means and intended to be moveable between a raised position which extends the pins beyond the plane of the conveying means and a retracted position which lowers the guide pins below the plane of the conveying means. The workpiece to be separated is positioned on the conveying means at the "load end" thereof with the guide pins disposed above the plane of the conveying means and between and along the center line for separating the workpiece into respective battery plates. The guide pins are then retracted below the plane of the conveying means and the conveying means will move the workpiece forward into contact with the separating means which will separate the workpiece into two halves about the center line previously established by the guide pins. The conveying means will then move the workpiece to the off loading end of the frame.

In addition, there is disclosed an improved apparatus which has a hood for vacuuming off the dust which is produced by the separating apparatus. The hood in the preferred embodiment includes small drive belts which are disposed above the conveying means and which are seen as an aid in clamping the workpieces when a plurality thereof are stacked thereon and in assuring that the workpieces will move in a steady manner through the separating unit.

It is the object of this invention to provide a separating apparatus having an improved center location means.

It is an object of this invention to provide a separating apparatus which can operate on a plurality of workpieces in a given cycle.

It is an object of this invention to provide an improved separating apparatus which has a vacuum hood for removal of harmful dust generated during the separating operation.

It is an object of this invention to provide a separating apparatus which will separate the workpieces along a pre-determined center line without regard to the external geometry or configuration of the workpiece.

BRIEF DESCRIPTION OF THE INVENTION

FIG. 3 is a partial section of the instant apparatus.

FIG. 3A is an exploded view of the partial section of FIG. 3.

FIG. 4 is a three dimensional orthographic projection of a workpiece prior to separation.

FIG. 5 is one plate as produced from the workpiece of FIG. 4 after separation in the instant apparatus.

DESCRIPTION OF THE PREFERRED EMBODIMENT

Figure 1:
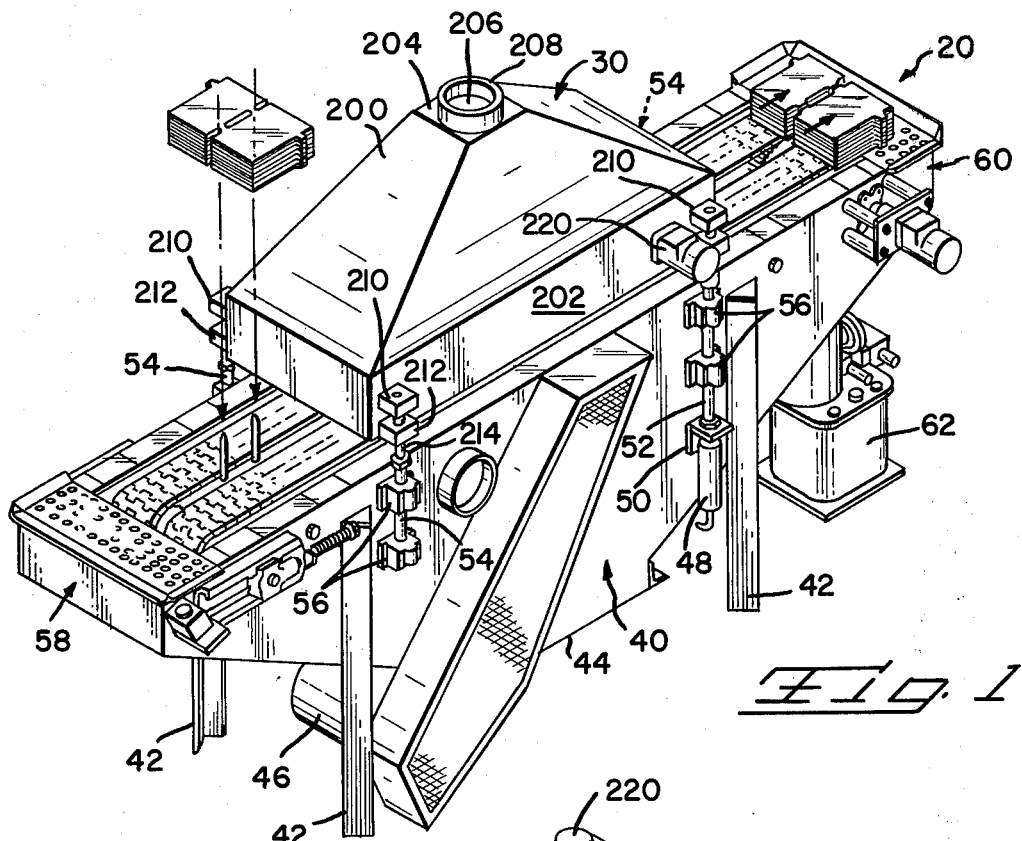
FIG. 1 is a three dimensional orthographic projection of an apparatus according to the instant invention with the hood member disposed thereon in what would be in the working position.

Before turning to the preferred embodiment of the apparatus, it is instructive to consider FIGS. 4 and 5 which depict the workpieces to be operated on in the preferred embodiment and the end product of that operation. The workpiece generally designated as 2 is a casting formed of lead alloy to which there has been adhered a lead paste for use in producing battery plates. The process of casting the grid work and of adhering the lead paste thereto will be familiar to those skilled in the art. A typical workpiece 2 will have two battery plates 4 disposed about and intermittently joined along centerline 6. The outside edges of the workpiece have two U-shaped recesses 8, disposed about the centerline 6. An oblong separation 10 is disposed approximately midway in from either side of the workpiece 2 and about the centerline 6. The two battery plates will be joined at the areas generally designated as 12. Each battery plate will have, at one corner thereof remote from the centerline 6, an inner connection lug 14.

Referring now to FIG. 5, there is shown a single battery plate 4. The battery plate 4 now has along what was previously the line of inner connection, two feetlike members 13 which are disposed on either side of the recess 11. Recess 11 as can readily be seen is one-half of the oblong opening 10. On either outward edge of feet 13, there is recess 9 which again can readily be seen to be one-half of the recess 8. The battery plate 4 as shown in FIG. 5 would then be used in a normal process of producing a storage battery.

Referring now to FIG. 1, there is shown an apparatus according to the instant invention generally designated as 20 having a hood generally designated as 30 disposed over a base assembly generally designated as 40. The base assembly is supported by legs 42 which are disposed about the four corners and a pod 44 which is located approximately in the center of the base assembly 40. A drive motor 46 for operating the cutting device is mounted below the base 40 and to one side of the pod 44. A hydraulic cylinder 48 is mounted on the base assembly 40 via bracket 50 for operating the hood assembly. The hood assembly 30 is moved vertically away from base 40 via the shaft 52 which is biased by the hydraulic cylinder 50. The shaft 52 and guide sleeves 54 which are disposed on the remaining three corners of the hood 30 are slideably mounted in guide blocks 56. The operation of the hood 30 and its relationship to the base 40 will be more fully explained hereinafter. Disposed beneath the unloading end 60 of the base assembly 40, there is a hydraulic power assembly 62 which through a series of hydraulic valves and limit switches provides the hydraulic power for operation of the instant apparatus.

Figure 2:
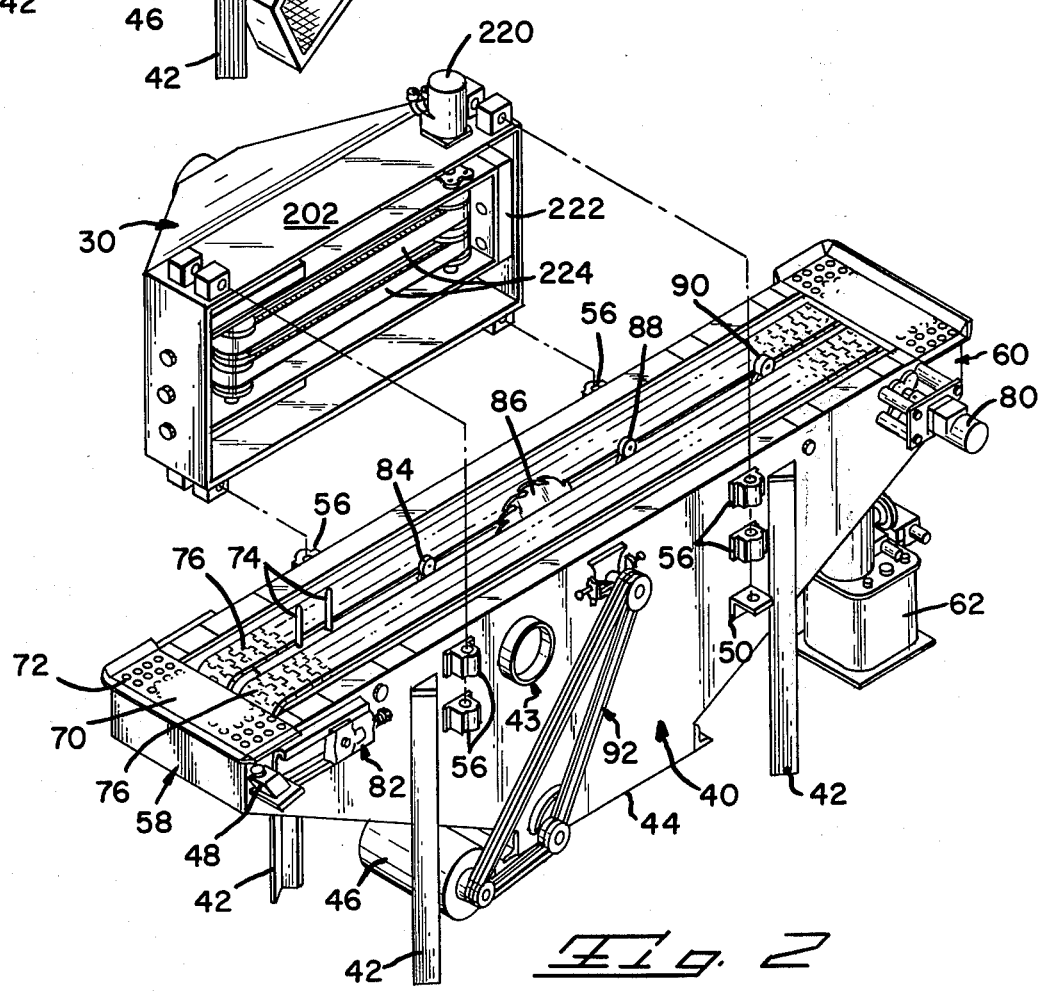
FIG. 2 is the apparatus of FIG. 1 with the hood exploded up and away to detail the lower ends of the hood and to provide an overall view of the work area for the instant apparatus.

Referring now to FIG. 2, there is shown the base 40 with the hood assembly 30 exploded up and away therefrom. At the load end 58 of base 40 there is a registration table 70 which has a plurality of small perforations 72 therein. The operator of the apparatus would take a plurality of workpieces 2 and square the edges manually against this registration table 70 by tapping gently thereon. The perforation 72 are provided so that small amounts of the lead paste which are not properly adhered to the workpieces 2 will fall through the perforations 2 and out of the work area. The workpieces 2 are then located over the registration pins 74 so that the pins are disposed on either side of oblong opening 10 and within recesses 8. The workpieces are laid flush on the base conveyors 76. A start button 78 is disposed at the load end of the base 40 and a conveyor motor 80 is disposed at the unloading end of base 40. The conveyor 76 and the conveyor motor 80 are standard conveying items which will be familiar to those in the art. Additionally, as it will be familiar to those in the art, a conveyor tension adjusting means 82 is disposed at the loading end 58 of the base assembly 40. Note also that the conveyor 76 is divided into two belts which are disposed on either side of registration pins 74, limit valve 84, saw blade 86, limit valve 88 and limit valve 90. The saw blade 86 is driven by the motor 46 through a belt and pulley assembly 92. As previously mentioned, the conveyor 76 is driven by the hydraulic motor 80.

Turning now to FIG. 3, the base assembly 40 has been partially sectioned to reveal the entire assembly associated with registration pins 74. As can be seen, a support bracket 102 spans the width of the assembly 40 and is disposed through the loops of conveyor 76. A hydraulic cylinder 100 is fixedly mounted on bracket 102 and is centered between the belts of conveyor 76. A piston 104 which is biased and returned in the vertical direction by cylinder 100 is attached to registration pins 74. Thus the cylinder 100 will bias the pins 74 above the upper plane of conveyor 76 to accept the workpieces 2 thereon and then will retract the pins 74 to permit the workpieces to sit firmly on the conveyor 76 and to travel in what would be a leftward direction in FIG. 3. Note also, that a limit valve 104 is associated with the operation of cylinder 100. The limit valve is disposed beneath the conveyor 76 and will not release the pins 74 into a retracted position until the workpiece 2 has been firmly placed upon the conveyor 76. Likewise, the limit valve 104 will not permit the pins 74 to raise in a vertical direction when there is a previous workpiece positioned at the remote end of conveyor 76.

The saw blade 86 is disposed in the center of conveyor 76 and aligned with the alignment pins 74. The saw blade 86 is positioned by means of a mount 108 which is affixed to the base assembly 40 and a bearing and collar assembly 110 which is affixed to the mount 108. A connecting shaft 112 is affixed to the center of the rotary blade 86 in the usual fashion. The shaft 112 extends through the bearing and collar assembly 110 in the usual fashion and out the side wall of base assembly 40. Blade 86 is powered by the belt drive assembly 92.

As can be seen from FIG. 3, base assembly 40 is constructed as a hollow bin for the collection of dust and other particles which are generated during the sawing operation. The base assembly 40 tapers in from either end to a center collection drawer 45, in this way waste matter which gathers in the base assembly 40 may be easily disposed of. A collar 43 is provided on base assembly 40 to permit attachments of a vacuum hose to further draw off waste materials.

Referring now to FIG. 3A, there is shown in exploded view registration pins 74, associated cylinder 100, assembly bracket 102 and limit valve 104. The registration pins 74 are shown in the retracted position. Note that the registration pins 74 retract to approximately a quarter of an inch below the conveyor 76. Limit valve 104 is mounted on a bracket 102 such that it will not be contacted by the registration pins 74 until the registration pins have moved below the conveyor 76 and are within the quarter inch range previously mentioned. In this manner the limit valve 104 assured that the registration pins 74 will be removed from the workpiece and below the conveyor, prior to starting of the conveyor. This safety feature is easily achieved by making the 104 limit valve an override switch to the start button 78.

Referring again to FIG. 2, it is now instructive to consider the sequence and purpose of the limiting valves 84, 88 and 90. As previously mentioned, a plurality of workpieces 2 are blocked at the loading end of the apparatus and are placed over the registration pins 74. The start button 78 is then pushed by the loading operator and at that point with the limit valve 104, not shown in FIG. 2. In proper position the conveyor belt moves at a first rate of speed in what is a generally rightward direction in FIG. 2. As the workpieces contact the limit switch 84, a signal is sent to the motor 80 to modify the speed of conveyor 76 to a second lower rate of speed. At that point, a signal is also sent to the motor 46 to actuate the saw blade 86 and lower the hood 30 over the conveyor 76 and into contact with the workpieces thereon. The workpieces are then moved through the blade 86 at the lower rate of speed. After the workpieces have proceeded beyond the blade 86 they contact limit switch 88 which signals the accelerating of the belt 80 to the first higher speed, raising of hood 30 off the workpieces and deactivating of motor 46, thus stopping the saw blade 86. The workpieces will proceed along the conveyor at the higher rate of speed until they contact limit valve 90. At this point, the limit valve 90 will cease the operation of the conveyor 76 and shutdown the operation of the apparatus. When the workpieces are removed from limit valve 90, that signals the raising of the pins 74 back to and above the conveyor 76. Additionally, as long as the workpieces remain in contact with the limit valve 90 the start button 78 will deactivate much as in the manner as it was deactivated by the limit valve 104.

Referring again to FIG. 1, the hood assembly 30 is comprised basically of a large open hood 200 mounted on a rectangular frame 202. The hood 200 tapers upwardly and inwardly from the frame 202 and terminates in a flat top plane 204, having a opening 206 therein. A collar 208 is mounted on plane 204 and surrounds opening 206. A vacuum hose not shown, would be attached to the collar 208 and thereby provide vacuum to the hood assembly 30 for drawing off dust particles and such which are generated during the sawing operation. Frame 202 has disposed on either longitudinal side thereof paired parallel flanges 210 and 212 respectively. The flanges 210 and 212 are located on frame 202 so as to be disposed directly over the sleeves 54. The flanges 210 and 212 in 3 corners of the frame 202 have rods 214 attached thereto. The rods 214 fit within sleeves 54 and act as a guide system and in cooperation with the cylinder 48 and shaft 52 for moving the hood in vertical reciprocal motion. Mounted on the frame 202, on one longitudinal side, is a motor 20 which is used to drive the conveyor belts 224 which are positioned within the hood assembly 30.

Referring now to FIG. 2, there is shown a view of the hood raised above the base assembly 40 and tilted on its side. Note that within the frame 202 there is a conveyor frame 222 and parallel conveyor belts 224 which are mounted to frame 222. The belts 224 are positioned so as to be generally parallel to the conveyors 76 and on either side of the saw blade 86 when the hood 30 is in its downward position. As can be seen from the FIG. 2, the motor 220 has a shaft which extends through the frames 202 and 222 and drives the conveyors 224. The hood 30 and the conveyor motor 220 are synchronized such that when the hood is biased downward by the cylinder 48, the conveyors will be moved into contact with the top workpiece on the stack of workpieces placed on the conveyor 76. In this manner, as the motor 220 turns the conveyor belts 224, positive control is maintained over the workpieces as they are presented to the saw blade 86. Conveyor belts 224 aid in transporting the workpieces through the sawing station and are synchronized with motor 80.

It should be noted at this time that the use of the hood 30 is not essential to the operation of the conveyor 76. The blade 86, as is good practice, is designed in the particular application to turn in a counter-clockwise direction which will tend to draw the work into the saw blades. However, the advantage of hood 30 is that the workpiece generally produced contains lead which is known to be toxic substance and, therefore, as part of both safety and shop cleanliness use of the hood 30 is advised, particularly when there are a plurality of workpieces stacked for simultaneous sawing.

In the preferred embodiment, electrical power is used to operate the motor 46 and the hydraulic power assembly 62. The hydraulic power from assembly 62 is used to operated the conveyor motors 80 and 220 respectively.

All remaining functions on the machine are operated via pneumatic power. The hydraulic power assembly in a preferred embodiment is manufactured by Double A Product Company, Manchester, Mich. 48157. The pneumatic cylinders are manufactured by Pneumatics, Inc., 1450 North Milford Rd., Highland, Mich. 48031. Other components of the preferred embodiment such as the conveyor 76 and the conveyors 224 are commercially available items and many substitutions therefor may be made. It must be realized that limit switches, such as switch 84, 88, 90 and 104, and the particular logic with which they are placed within the apparatus may be changed for different application. The particular combinations of hydraulic, pneumatic and electrical circuitry are in no way limiting factors in the use of the instant apparatus. The particular arrangement of cut-off switches, safety precautions and logic, electrical, hydraulic and pneumatic, will vary according to particular applications. It should be realized however, that a totally electric apparatus could be designed, as well as other variations of drives for different functions.

Having set out the preferred embodiment of my invention, it is realized that variations thereon may be made without departing from the spirit of my invention or the scope of the claims amended hereto.

What is claimed is:

1. An apparatus for separating battery plates which are joined about a center line, said apparatus comprising:
    a generally rectangular frame;
    conveyor means disposed within said frame, said conveyor means having at least two space apart sections;
    registration means mounted on said frame and between said spaced apart sections for aligning said center line of said battery plates over said space, said registration means further being movable between a first position above the upper plane of said conveyor means and a second position below the upper plane of said conveyor means;
    separator means disposed between said spaced apart sections and in line with said registration means, said separator means further having a portion thereof which extends above the upper plane of said conveyor means; and
    drive means for activating said conveyor means and said separator means.

2. The apparatus of claim 1 wherein said apparatus further comprises:
    an upper conveyor means disposed above said frame and parallel to said conveyor means, said upper conveyor means having at least two spaced apart sections which are parallel to said conveyor means and on opposite sides of separator means.

3. The apparatus of claim 2 wherein said upper conveyor means is disposed above said frame via four corner posts, said four corner posts further comprising at least one post having operator means for moving said upper conveyor means vertically toward and away from said frame.

4. The apparatus of claim 3 wherein said upper conveyor means further comprises an open chamber disposed above said upper conveyor means.

5. The apparatus of claim 4 wherein said frame means further comprises a collection bin for gathering waste material.

6. The apparatus of claim 1 wherein said registration means further comprises:

two registration pins mounted on a common base, said base being mounted for vertical movement on a shaft and said shaft having drive means for moving said pins from a first position above the upper plane of said conveyor means to a second position below the upper plane of said conveyor means.

7. The apparatus of claim 6 wherein said drive means comprises a pneumatic cylinder.

8. The apparatus of claim 1 wherein said separator means comprises a rotary blade having a plurality of teeth disposed about the circumference thereof.

9. The apparatus of claim 8 wherein said rotary blade is driven by an electric motor.

10. The apparatus of claim 1 wherein said conveyor means further comprises:
two parallel closed loop conveyor belts, said closed loop conveyor belts being disposed on either side of said separator means with said separator means located at approximately the midpoint of said loop.

11. The apparatus of claim 10 wherein said conveyor belts are driven at one end thereof by a variable speed drive means and are tensioned at the other end thereof by a idler.

12. The apparatus of claim 1 wherein;
a first limit valve is positioned between said spaced apart sections and before said separator means, said first limit valve for reducing the speed of the conveyor means from a first rate to a second rate; and
a second limit valve is positioned between said spaced apart sections and after said separator means, said second limit valve for accelerating said conveyor means from said second rate to said first rate.

13. An apparatus for separating battery plates which are joined about a centerline, said apparatus comprising:
a chamber having a closed bottom surface and an open upper surface, said upper surface having a generally rectangular shape;
a conveyor means disposed within said chamber and proximate to said open surface, said conveyor means having at least two spaced apart and closed loop conveyor belts; two spaced apart and closed loop conveyor belts;
registration means mounted within said chamber and between said spaced apart closed loop conveyor belts for aligning said center line of said battery plate over said registration means, said registration means further being movable between a first position above the upper plane of said conveyor belts and a second position below the upper plane of said conveyor belts,
separator means disposed between said spaced apart conveyor belts and aligned with said registration means, said separation means further having a portion thereof which extends beyond the upper plane of said conveyor belts;
an upper conveyor means disposed above said chamber and parallel to said conveyor means, said upper conveyor means having at least two spaced apart conveyor belts which are parallel to said conveyor means and on opposite sides of said separator means, said upper conveyor means being disposed above said chamber via movable posts, said movable posts further comprising at least one post having operator means for moving said upper conveyor means vertically toward and away from said chamber,
a first limit valve positioned between said conveyor belts and before said separator means, said first limit valve for reducing the speed of said conveyor belts from a first rate to a second rate and for activating said operator to move said upper conveyor means toward said chamber, and
a second limit valve positioned between said conveyor belts and after said separator means, said second limit valve for accelerating said conveyor means from said second rate to said first rate and for activating said operator to move said upper conveyor means away from said chamber.

14. Apparatus for separating battery plates which are joined about a center line, said apparatus comprising:
a frame;
conveyor means disposed within said frame, said conveyor means having at least two spaced apart sections;
registration means mounted relative to said frame for aligning said center line of said battery plates over said space, said registration means further being moveable between a first position and a second position;
separator means disposed in line with said registration means, said separator means further having a portion thereof which extends at least to the upper plane of said conveyor means, and
drive means for activating said conveyor means and said separator means.

15. The apparatus of claim 14 wherein said registration means further comprises:
two registration pins mounted on a common support, said support being further mounted for vertical movement on a shaft and said shaft having drive means for moving said pins between a first position and a second position.

16. The apparatus of claim 15 wherein said drive means comprises a pneumatic cylinder.

17. The apparatus of claim 16 wherein said separator means comprises a rotary blade having a plurality of teeth disposed about the circumference thereof.

* * * * *